Sept. 15, 1942.  H. H. ALLEN  2,296,237
APPARATUS FOR MEASURING FLUID PRESSURE
Filed Dec. 6, 1939
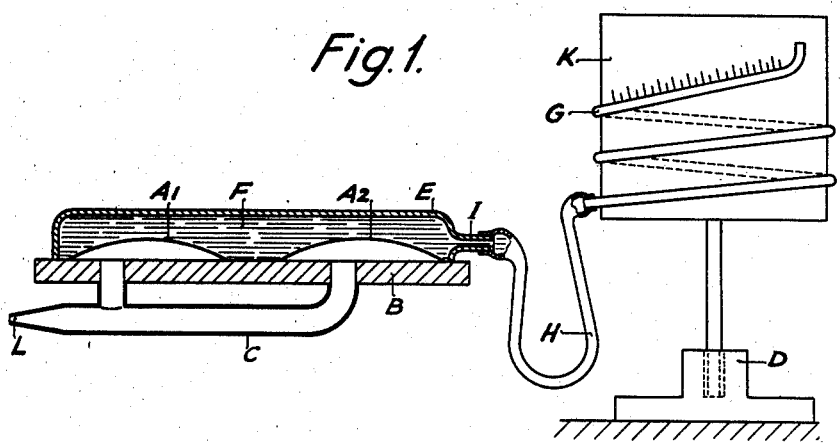
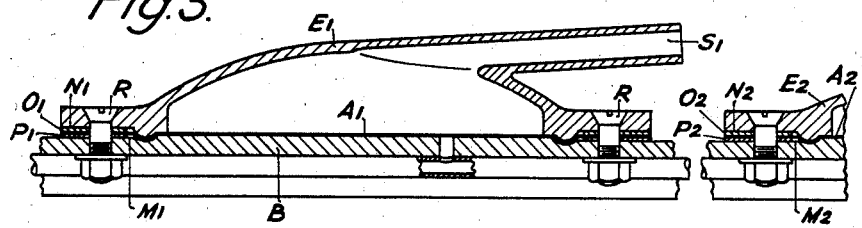
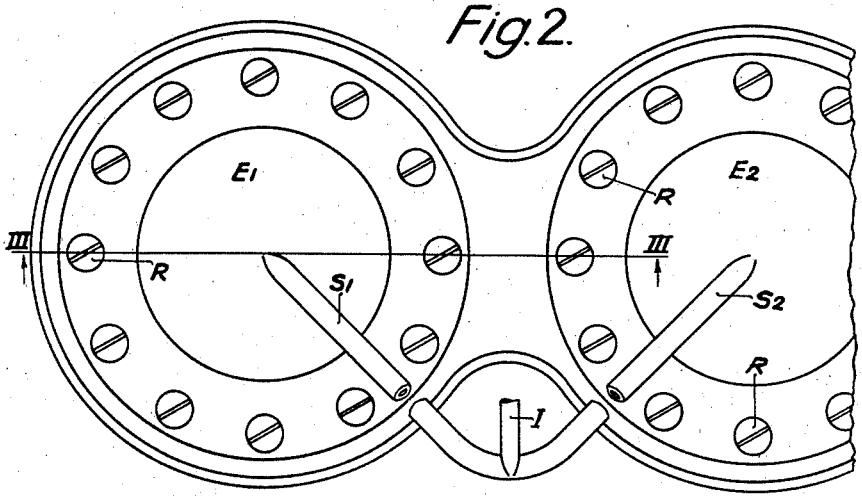
INVENTOR
Henry Hans Allen.
BY
ATTORNEY Patented Sept. 15, 1942

2,296,237

UNITED STATES PATENT OFFICE 2,296,237

APPARATUS FOR MEASURING FLUID PRESSURE

Henry Hans Allen, London, England

Application December 6, 1939, Serial No. 307,820
In Great Britain December 12, 1938

4 Claims. (Cl. 73—110)

This invention relates to apparatus for measuring the pressure of fluids (gases, vapours or liquids), of the kind in which the pressure is applied to one side of an elastic diaphragm, hollow body or chamber the other side of the elastic member being in contact with a liquid which is displaced within a gauge tube when the elastic member is deflected by the pressure to be measured.

A primary object of the present invention is to provide an apparatus of this character which with a high degree accuracy also has a large range. A further object is to provide an apparatus of this character with a convenient scale which nevertheless is of the great length called for by the high accuracy and large range. A still further object is to provide means for maintaining the accuracy of an apparatus of this type.

The total range of deflection and the maximum size of an elastic member suitable for the purpose in view are limited, indeed the greater the maximum pressure to be provided for, the smaller these limits become, so that the volume of liquid displaced is similarly limited; and although the smaller the bore of the gauge tube the greater its magnifying effect, there are practical limits to the smallness of this bore. According to the present invention, to increase the volume of liquid displaced, two or more elastic members are exposed on one side to the pressure to be measured while their other sides are in contact with one and the same body of liquid which is displaced in a single gauge tube, so that the displacement is the sum of the individual displacements. This has two advantages.

1. By arranging a suitable number of elastic members such as diaphragms mutually in contact with a liquid the volume displaced can be made as large as desired, so filling any desired length of gauge tube independently of its bore and, consequently, permitting any desired fineness of subdivision of the graduation.

2. The dimensions of the elastic members may be chosen so that, within the range of measurement required, the bending or deflection of the diaphragm remains within the limits for which the dependence on the pressure is most favourable. Therefore higher pressures for which, for reasons of strength, thicker diaphragms of a smaller diameter must be used, i. e., diaphragms suffering a smaller bend, can without difficulty be measured with the same degree of accuracy and over a great range of pressures. The volume of liquid displaced and consequently the degree of subdivision can always be made sufficiently great by a corresponding increase in the number of diaphragms used.

Conveniently a plate or frame is used on which are mounted two or more diaphragms, connected together in such a way that their one sides can be simultaneously acted upon by the pressure to be measured, whilst their other sides are all in contact with a liquid to be displaced in a gauging device. As a gauging device a tube made of a transparent material such as glass should preferably be used. The pressure sides of the diaphragms mounted on the plate or frame may be connected by a tube or system of tubes which has the pressure inlet at its other end. The liquid sides of the diaphragms may be connected by a hood covering all diaphragms mounted on the plate or frame and provided with an outlet tube, or each may have its own hood and outlet tube, the latter being connected together.

If measurements are to be taken over a large range with a great degree of accuracy, for example within a pressure range from 0 to 10,000 mms. water column with an accuracy of 1 mm. water column, the gauge tube will be very long if there is to be sufficient space between consecutive markings of the graduation. In order to reduce the space required for the tube and to increase the convenience of reading, the tube may, as already known, be bent into the form of a helix.

According to a further feature of the present invention convenience in reading is still further increased by arranging the helically shaped tube to be rotatable about its axis independently of the elastic element, as by introducing a flexible connection between the two and suitably mounting the helical tube for instance on a revolubly mounted cylinder.

For the maintenance of a constant measuring accuracy it has proved of importance that the speed at which the diaphragms bend when taking measurements and when recovering should be given a comparatively low value. For that purpose the pressure inlet tube is provided with some suitable throttling device which, for instance, for the measuring of pressure in gases or air may consist of a nozzle.

The invention will be further described with reference to the accompanying drawing in which:

Figure 1 is a diagrammatic section showing the general arrangement of an example of apparatus according to the invention, having two resilient bodies in the form of diaphragms.

Figure 2 is a plan view of part of the apparatus.

Figure 3 is a detail section on the line III—III of Figure 2, on a larger scale.

In Figure 1 $A_1$, $A_2$ are the diaphragms, B the plate or frame on which the diaphragms are mounted, C the pressure inlet tube communicating with the undersides of the diaphragms $A_1$, $A_2$, E the hood which covers the upper sides of the diaphragms $A_1$, $A_2$. The space F under the hood E is filled with a suitable liquid. The hood E has an outlet tube I which is connected by a flexible connection, for example a rubber tube H, with a helical glass tube G wound round a hollow cylinder K. The hollow cylinder K on which the graduation is marked is revolubly supported by means of the bearing D. L is a nozzle for throttling the pressure inlet.

Figures 2 and 3 show a suitable practical form of the diaphragm mounting, the same references being used for the parts as in Figure 1. The plate or frame B is provided with two rims $M_1$, $M_2$ forming a mounting for the diaphragms $A_1A_2$ and the hoods $E_1$, $E_2$, here shown as one for each diaphragm, have corresponding rims $N_1N_2$. The diaphragms $A_1$, $A_2$ are clamped between the rims by screws R, rubber washers $O_1O_2$, $P_1P_2$ being interposed respectively above and below the diaphragms to seal the edges. The hoods have outlet tubes $S_1S_2$ which unite at the common outlet tube I by which connection is made as in Figure 1 to the graduated tube not shown in this figure.

With the apparatus described the measuring of the pressure is done as follows. The apparatus including the rubber tube H is filled with a suitable liquid up to any marked zero-point at the lower end of the glass tube G. The pressure inlet tube C is connected up to the pressure to be measured. Under the influence of the pressure the diaphragms $A_1A_2$ bend upward thus displacing a corresponding amount of liquid. The displaced liquid rises in the tube G and the pressure to be measured can be read off direct, provided the scale has previously been suitably calibrated in pressure units. By turning the cylinder K all points of the scale can be read off from one position.

The term pressure used herein is to be understood in its absolute meaning that is to say it includes sub-atmospheric as well as super-atmospheric pressure. It is also to be understood that though the illustrated example shows two diaphragms, any suitable number will be used depending on the total pressure range and fineness of graduation required. Again instead of the graduated tube being coiled up in the form of a cylindrical helix, it could be coiled up in some other form for example as a flat or conical spiral.

What I claim is:

1. In apparatus for the measurement of fluid pressures the combination of a base having a supporting surface lying in a single horizontal plane, a plurality of disk-form diaphragms secured side by side to said supporting surface, means for applying a single pressure to be measured to the same face of all of said diaphragms simultaneously, means for enclosing a single body of liquid in contact with the other face of all of said diaphragms, and means for indicating the displacement of such liquid caused by deflection of said diaphragms.

2. In apparatus for the measurement of fluid pressures the combination of a base having a surface lying in a single horizontal plane, a plurality of identical disk-form diaphragms secured by their edges to said surface, a common conduit having branches opening out of said base under each of said diaphragms respectively whereby the pressure to be measured can be imposed under identical conditions on each of said diaphragms simultaneously, means for confining a common body of liquid in contact with and over the faces of all of said diaphragms, and means for indicating displacement of such liquid caused by deflection of said diaphragms.

3. In apparatus for the measurement of fluid pressures the combination of a base having an upper face lying in a single horizontal plane, a plurality of equal disk-form diaphragms secured by their edges to the upper face of said base, a common conduit having branches opening out of said base under each of said diaphragms respectively whereby the pressure to be measured is imposed under identical conditions on all of said diaphragms simultaneously, a hood over each said diaphragms making joint round the edge thereof, a conduit joining together the space under all said hoods, a body of liquid filling said space and conduit, and means indicating displacement of said liquid caused by deflection of said diaphragms.

4. In apparatus for the measurement of fluid pressures the combination of a base having an upper face lying in a single horizontal plane, a plurality of identical disk-form diaphragms, a plurality of hoods whereby said diaphragms are hermetically clamped by their edges to the upper face of said base and lower rims of said hoods, a common conduit having branches opening out of said base under each of said diaphragms respectively whereby the pressure to be measured is imposed under identical conditions on all of said diaphragms simultaneously, a conduit joining together the space under all said hoods, a body of liquid filling said space and conduit, and means indicating displacement of said liquid caused by deflection of said diaphragms.

HENRY HANS ALLEN.